US007421691B1

(12) United States Patent
Hancock et al.

(10) Patent No.: US 7,421,691 B1
(45) Date of Patent: Sep. 2, 2008

(54) SYSTEM AND METHOD FOR SCALING PERFORMANCE OF A DATA PROCESSING SYSTEM

(75) Inventors: Peter J. Hancock, White Bear Lake, MN (US); Lee B. Hansen, Forest Lake, MN (US); Daniel J. Lenz, Maplewood, MN (US); Hans C. Mikkelsen, Afton, MN (US); Ronald S. Tanning, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 976 days.

(21) Appl. No.: 10/744,660

(22) Filed: Dec. 23, 2003

(51) Int. Cl.
*G06F 9/46* (2006.01)
(52) U.S. Cl. ...................... 718/100; 718/104
(58) Field of Classification Search ............ 718/100, 718/104; 713/183, 300; 700/28
See application file for complete search history.

(56) References Cited

U.S. PATENT DOCUMENTS 5,365,587 A * 11/1994 Campbell et al. ........... 713/183

| | | | |
|---|---|---|---|
| 5,982,899 A * | 11/1999 | Probst | 713/1 |
| 6,978,374 B1* | 12/2005 | Hansen et al. | 713/183 |
| 2003/0135580 A1* | 7/2003 | Camble et al. | 709/216 |
| 2004/0215748 A1* | 10/2004 | Boonie et al. | 709/220 |
| 2007/0118721 A1* | 5/2007 | Stewart et al. | 712/15 |

* cited by examiner

*Primary Examiner*—Meng-Ai An
*Assistant Examiner*—Eric C Wai
(74) *Attorney, Agent, or Firm*—Charles A. Johnson; Robert Marley; Shumaker & Sieffert, P.A.

(57) ABSTRACT

A system and method for scaling the performance of a data processing system is disclosed. According to one method, a level of system performance is purchased for use with the data processing system. This purchased performance level is described in Millions of Instructions Per Second (MIPS) or a similar unit of measure. A system administrator selects which resources within the data processing system will be enabled, as well as how those resources will be configured. The enabled system resources will include one or more instruction processors. The performance of each of the enabled processors is then scaled to achieve the purchased system performance level. Performance scaling is performed in a manner that takes into account characteristics associated with the selected configuration as well as the system architecture.

35 Claims, 8 Drawing Sheets

NORMAL AUTHORIZATION KEY

| PARAMETER | ATTRIBUTES |
|---|---|
| MODEL NUMBER | IX6601-41 |
| SERIAL NUMBER | 00001000 |
| MAXIMUM PERFORMANCE | 80% |
| MAXIMUM NUMBER OF IPs | 2 |
| IP IDENTIFIER | IP0, IP1 |
| MAXIMUM TIME OF USE | 5 YEARS |

*Figure 2A*
*(Prior Art)*

OPTIONAL AUTHORATION KEY

| PARAMETER | ATTRIBUTES |
|---|---|
| MODEL NUMBER | IX6601-41 |
| SERIAL NUMBER | 00001000 |
| MAXIMUM PERFORMANCE | 100% |
| MAXIMUM NUMBER OF IPs | ANY 4 |
| IP IDENTIFIER | N/A |
| EXPIRATION DATE | 1-JAN-04 |
| MAXIMUM TIME OF USE | 10 DAYS |

*Figure 2B*
*(Prior Art)*

| PARAMETER | ATTRIBUTES |
|---|---|
| MODEL NUMBER | IX6601-41 |
| SERIAL NUMBER | 00001000 |
| MAXIMUM PERFORMANCE | 450 MIPS |
| EXPIRATION DATE | 1-JAN-09 |
| MAXIMUM TIME OF USE | 5 YEARS |

*Figure 2C*

| CONFIGURATION | MAXIMUM PERFORMANCE |
|---|---|
| 1 IP | 200 MIPS |
| 3 IPs IN ONE SUBPOD | 500 MIPS |
| 4 IPs IN ONE SUBPOD | 630 MIPS |
| 4 IPs ACROSS TWO SUBPODS | 550 MIPS |
| 8 IPs ACROSS TWO SUBPODS | 900 MIPS |

*Figure 3*

SYSTEM AND METHOD FOR SCALING PERFORMANCE OF A DATA PROCESSING SYSTEM

REFERENCE TO CO-PENDING APPLICATIONS

The following commonly assigned co-pending applications have some subject matter in common with the current application:

"Authorization Key System for Selectively Controlling the Performance of a Data Processing System", Ser. No. 09/676,162 filed Sep. 29, 2000, and which is incorporated herein by reference in its entirety, Ser. No. 10/744,685 entitled "System and Method for Metering the Performance of a Data Processing System" filed on even date herewith.

Ser. No. 10/744,040 entitled "Method and System for Economic Valuation in Partitioned Computer Systems", filed on even date herewith.

FIELD OF THE INVENTION

The current invention relates generally to data processing systems, and more particularly to methods and apparatus for selectively controlling the performance level of data processing systems.

BACKGROUND OF THE INVENTION

Many growing businesses are challenged with ensuring that their data processing systems keep pace with expanding demands. This is particularly true for rapidly growing e-commerce companies, but also applies to other companies as well.

Another challenge facing many businesses is that of predicting and handling the peak loads that will be required to keep up with the day-to-day operations. For example, if there is a delay in gathering year-end data, there may be little time to process the data before the results must be published or otherwise released. The processing power required to handle such year-end data on such short notice may exceed the processing power of the available computer resources. In another example, e-commerce servers may experience severe peak loads during certain times of the year, such as the Christmas season. The extent of these peak loads is also often difficult to predict.

One way to increase processing power is to acquire additional processing systems. This can be expensive, and is not desirable if the additional systems are only required to address peak loads that exist during relatively short time periods. Another way to increase processing power is to modify existing systems. This may involve installing additional processors or memory, for example. However, system updates may necessitate the termination of normal processing activities so that the system can be powered down or otherwise placed in a state that accommodates maintenance. This can significantly disrupt the operations of the business. Moreover, updating a system to take into account peak demand is undesirable if this worst-case scenario rarely occurs.

One way to address the foregoing challenges involves allowing for the temporary increase of resources only when those resources are required to achieve a desired performance level. This is accomplished by including additional resources such as processors and memory in the data processing system when it is provided to the customer. However, only the resources that are required to provide the performance level purchased by the customer are enabled for use during normal operation. To temporarily or permanently increase the performance level of the data processing system, the customer may purchase an authorization key to enable the use of additional hardware resources. The authorization key may, for example, identify which additional processing resources are being authorized for use, the maximum time the additional resources are authorized for use, and an expiration date. This authorization key thereby allows selective increases in performance level to accommodate unplanned increases in performance requirements. When peak demand has ended, the customer may return to average processing levels without incurring the cost burden associated with permanently upgrading a system or obtaining additional systems.

Commonly-assigned U.S. patent application entitled "Authorization Key System for Selectively Controlling the Performance of a Data Processing System", Ser. No. 09/676,162 filed Sep. 29, 2000, and which is incorporated herein by reference in its entirety, discloses an exemplary system of the type described in the foregoing paragraph. According to one embodiment of the disclosed system, the customer purchases a first authorization key that is delivered with the system. This key enables a first set of processing resources. If the customer later desires the option of enabling additional resources to increase the performance of the system, a second authorization key may be purchased.

Prior art systems such as that described above generally select performance level by identifying the system resources that will be enabled. For example, authorization keys provided with the system specifically identify the Instruction Processors (IPs) that are enabled for use. If one of these identified IPs encounters some type of hardware problem, the customer is not allowed to instead employ one of the other available processors that is not specified by the key. Thus, encountered hardware problems may result in degraded throughput.

Another aspect of prior art systems involves the fact that authorization keys specify the number of IPs that may be enabled within the system, not the processing power actually available from those processors. However, the processing power that will be obtained from a predetermined number of IPs varies based on architectural characteristics of the data processing system. For example, four IPs that are coupled to a shared cache may provide significantly more processing throughput than two IPs that are operating from a first shared cache, and an additional two IPs utilizing a second shared cache. Thus, the customer may not always be obtaining peak performance from the enabled resources.

An additional consideration associated with prior art systems relates to the use of multiple partitions within a data processing system. A partition is a grouping of resources that are allocated to execute in a cooperative manner to perform one or more assigned tasks. For example, a partition may be formed that includes one or more predetermined IPs and Input/Output Processors (IOPs), and a predetermined memory range within a shared main memory. A second partition may be created to include different IPs and IOPs, and a second memory range. Each of these partitions may operate independently from the other so that a number of tasks may be executed in parallel within the system. When system needs change, the partitions can be re-defined. For instance, if needed, all resources may be allocated to the same partition and assigned to execute a high-priority task.

Some prior art keys are "partitionable", meaning these keys support the use of partitioning. Partitionable keys can be activated in a single partition, or in multiple partitions. For example, assume a partitionable key allows six identified IPs to be enabled. These IPs may be allocated to the same partition. Alternatively, two partitions may be created, each including three of the identified IPs. When all six of the identified IPs are in use, the operating system prevents the use of any more IPs in any of the partitions.

Prior art partitionable keys do not account for system characteristics. For example, assume in the above example that three of the six identified IPs share a first cache, and the remaining three IPs share another cache. In this type of configuration, a single partition containing all IPs will deliver less processing power than two partitions that each include a cache and the respective IPs. This is true because of the loss of throughput that occurs when data must be shared between two caches of the same partition. Because the partitionable keys do not take into account such architectural considerations, the customer may not always be obtaining peak performance from the enabled resources. Additionally, since one partitioning configuration may provide more processing power than another configuration, the keys are difficult to price fairly.

What is needed, therefore, is an improved system and method for controlling and scaling the performance level of a data processing system in a manner that addresses the foregoing issues.

SUMMARY OF THE INVENTION

The following invention provides an improved system and method for scaling the performance level of a data processing system to a predetermined level purchased by a customer. The performance level specifies the amount of work that can be done in a predetermined period of time within the data processing system. In one embodiment, this predetermined performance level is specified using a metric that describes processing power, such as Millions of Instructions Per Second (MIPS).

According to the current invention, the performance of a data processing system is specified without any restrictions on the hardware that may be used to achieve this processing power. The customer may therefore select which resources within the data processing system will be enabled, as well as how those resources will be configured.

The foregoing can best be appreciated by example. Assume that a data processing system includes multiple IPs. A customer may choose to enable any or all of these IPs to achieve the purchased performance level. The processing power of each of the IPs will automatically be scaled so that the performance level of the data processing system does not exceed the purchased level. Additionally, the customer may create one or more processing partitions to include the one or more enabled IPs. For instance, all enabled IPs may be included in the same partition, or may be divided between multiple partitions. Characteristics associated with the system architecture will be taken into account when scaling the performance of each partition so that the system as a whole will provide the purchased performance level.

According to one embodiment of the invention, the scaling of system performance is accomplished using one or more lookup tables. These tables contain data indicating the peak processing power that will be provided by any allowable configuration of the data processing system. A customer purchases a predetermined performance level and then selects a system configuration. A scaling factor is derived for the selected configuration by dividing the purchased performance level by the peak performance level. This scaling factor is then used to scale the processing power of each of the enabled IPs.

In a variation of the foregoing, a customer may create multiple processing partitions, as discussed above. Each partition is allocated a portion of the total purchased performance. A scaling factor is created for each partition by dividing the performance allocated to the partition by the peak performance level that may be obtained for that partition. The maximum processing power delivered by each IP within the partition is then scaled by the scaling factor of the partition.

According to one aspect of the invention, the processing power of an IP is scaled by a Software Controlled Performance Facility (SCPF). The SCPF limits the time each IP spends executing processing tasks. In one embodiment, SCPF may force an enabled IP to enter an idle state for a predetermined amount of time required to achieve a scaled performance level.

The inventive system and method provides several benefits over the prior art solutions. Customers are allowed to utilize any available hardware, which is automatically scaled to provide up to the maximum purchased performance level. The customer may therefore modify the system configuration to compensate for any hardware faults so that system throughput will not be affected by such faults. Moreover, the configuration may be adjusted to take into account the types of work being processed, thereby maximizing system throughput. In one embodiment, the SCPF may perform configuration modification automatically based on some trigger condition such as time of day, or the type of work available for processing. In all cases, the performance of each IP is automatically scaled so that the overall system delivers the purchased level of performance.

According to one embodiment of the invention, a method of scaling the performance of a data processing system is disclosed. The data processing system has one or more processors and is capable of running in one or more configurations, each configuration including at least one of the processors. This method includes the steps of obtaining a predetermined level of performance for use with the data processing system, and configuring the data processing system to run in a selected one of the configurations. This method further includes scaling performance of each processor included within the selected configuration so that the data processing system is capable of delivering the predetermined level of performance.

Another embodiment of the invention provides a method of controlling the performance of a data processing system. This method includes providing a predetermined level of performance for use on the data processing system, allowing the data processing system to be configured in any selected one of multiple available configurations, and scaling the performance of the selected configuration so that the data processing system provides the predetermined level of performance.

According to another aspect, a data processing system is disclosed. This system includes at least one processor, a memory coupled to the at least one processor, and Software Controlled Performance Facility (SCPF) software stored within the memory. The SCPF software scales performance of selected processors so that these processors collectively deliver up to a predetermined performance level that is available for use on the data processing system.

Still another embodiment provides a system for controlling the performance of a data processing system that has one or more processors. The system includes system console means for configuring selected ones of the processors for use within the data processing system. The system further includes SCPF means for limiting the performance of the data processing system to no more than a predetermined performance level by scaling performance of the selected ones of the processors.

Other scopes and aspects of the invention will become apparent from the following description and the accompanying drawings.

BRIEF DESCRIPTION OF THE DRAWINGS

FIG. 2A is a diagram of an exemplary prior art authorization key.

FIG. 2B is a diagram of an exemplary prior art optional authorization key.

FIG. 2C is a diagram of an authorization key according to the current invention.

FIG. 3 is a table illustrating the maximum performance delivered by various configurations of a system such as that shown in FIG. 1.

DETAILED DESCRIPTION OF THE INVENTION

Figure 1:
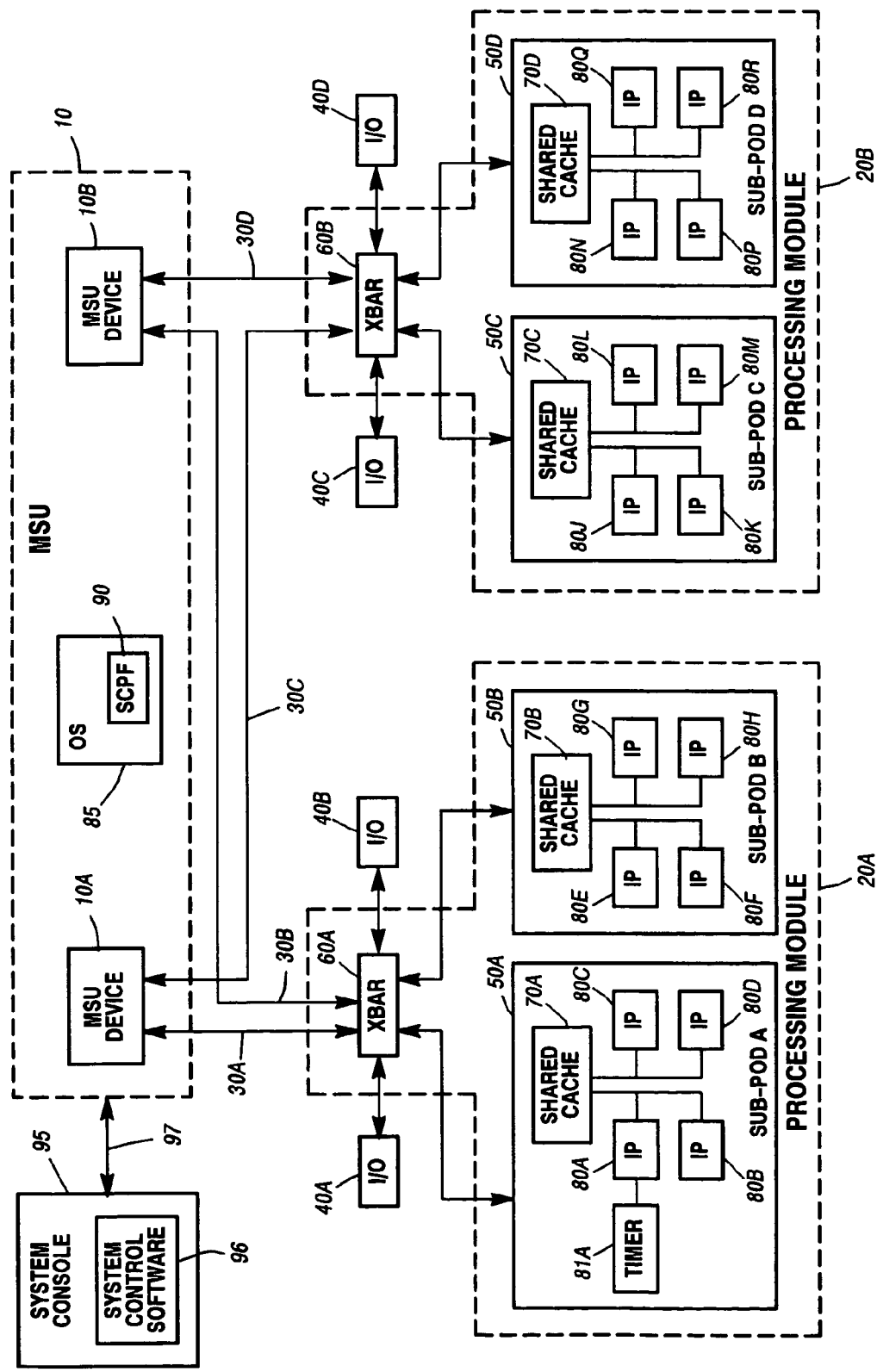
FIG. 1 is a block diagram of an exemplary system that may employ the current invention.

FIG. 1 is a block diagram of an exemplary system that may employ the current invention. This system includes a Memory Storage Unit (MSU) 10 (shown dashed) which provides the main memory facility for the system. The MSU includes one or more MSU devices individually shown as MSU 10A and MSU 10B, which each contains a predetermined portion of the memory space of the system. Many more MSU devices may be included within a full configuration.

The system further includes Processing mODules (PODs) 20A and 20B (shown dashed), which provides the processing capability for the system. A greater or lesser number of PODs may be included in the system than are shown in FIG. 1. In one embodiment, up to four PODs are included in a fully populated system.

Each of the PODs is coupled to each of the MSU devices via a dedicated, point-to-point connection referred to as an MSU Interface (MI), individually shown as MIs 30A through 30D. For example, MI 30A couples POD 20A to MSU device 10A, MI 30B interfaces POD 20A to MSU 10B device, and so on.

Each POD includes two Sub-Processing modules (Sub-PODs) and a crossbar module (XBAR). For example, POD 20A includes sub-PODs 50A and 50B and XBAR 60A, and so on. Each sub-POD is interconnected to the respective crossbar module (XBAR) through a dedicated point-to-point interface.

The system of FIG. 1 may further include Input/Output modules (I/Os) individually shown as I/Os 40A through 40D. The I/O modules provide the interface between various Input/Output devices or communications links and a respective one of the PODs 20. Each I/O module is coupled to a POD via the POD's XBAR. For example, I/O 40A is coupled to XBAR 60A, and so on. XBAR 60A both buffers data for the respective sub-PODs 50A and 50B and I/O modules 40A and 40B, and functions as a switch to route data between any of these sub-PODs and I/O modules to an addressed one of the MSU devices 10A and 10B.

In the exemplary system of FIG. 1, each sub-POD includes a shared cache and one or more Instruction Processors (IPs). For example, sub-POD 50A includes shared cache 70A and IPs 80A-80D. Other sub-PODs are similarly configured. In one embodiment, a sub-POD 50 may include between one and four IPs 80. Each IP may include one or more dedicated caches and interface logic for coupling to the interface with the shared cache. The shared cache stores data for each of the IPs within its sub-POD. Finally, each IP includes a quantum timer. For example, IP 80A is shown to include quantum timer 81A. A quantum timer is a counter/timer that has many system uses, including the facilitation of multi-tasking for the respective IP, as will be discussed below.

The system of FIG. 1 includes at least one instance of an Operating System (OS) that is loaded into MSU 10 to control the system. OS 85 is shown generally occupying memory included within MSU 10, and it will be understood the selected memory range in which OS 85 resides will actually be provided by one of MSU devices 10A or 10B.

Also shown residing with MSU 10 is at least one instance of a Software Controlled Performance Facility (SCPF) go. The SCPF may be implemented in the kernel of OS 85 as shown in FIG. 1, or implemented as a stand-alone entity. In either case, the SCPF controls the processing power delivered by each of the IPs 80 within the system, as will be discussed further below.

Finally, the system of FIG. 1 includes a system console 95, which may be a workstation, personal computer, or some other processing hardware that is executing system control software 96. This system console is coupled to the other units in the system via a scan interface 97. Although for simplicity, the scan interface is shown coupled solely to MSU 10, it will be understood it is coupled to the other units in the system as well.

System console performs initialization, maintenance, and recovery operations for the system via the scan interface. In addition, system console may be employed by an operator to perform configuration activities in a manner to be discussed below.

It will be appreciated that the system of FIG. 1 is merely provided for discussion purposes. Any other data processing system having any other type of configuration may usefully employ the inventive system and method to be discussed in the following paragraphs. With the foregoing available for discussion purposes, the current invention is described in regards to the remaining drawings.

FIG. 2A is a diagram showing an illustrative prior art authorization key. This key is a "normal" authorization key that is intended for relatively long-term use. The illustrated key has a maximum time of use of five years. Instead of, or in addition to, this maximum time of use, the key may include an expiration date dictating the last day on which the key may be used. A system and method for utilizing authorization keys of the type shown in FIG. 2A are disclosed in commonly-assigned U.S. patent application entitled "Authorization Key System for Selectively Controlling the Performance of a Data Processing System", Ser. No. 09/676,162, filed Sep. 29, 2000, which is incorporated herein by reference in its entirety.

The exemplary key of FIG. 2A authorizes use of two processors identified as "IP0" and "IP1" in the IP identifier field. The allowable maximum performance level for each of these IPs is set to 80%. This key further specifies the model and serial numbers of the target data processing system that will use the key. This data processing system may be similar to that shown in FIG. 1, for instance. The model and serial numbers specified in the authorization key may be used to validate the authorization key when it is registered on the data processing system. For example, when the authorization key is registered, the model and serial numbers specified in the authorization key are compared with the model and serial number of the data processing system. If this data does not match, the authorization key may be rejected as invalid.

Assume the authorization key illustrated in FIG. 2A is initially provided with a data processing system having two sub-PODs 50 and eight IPs 80. The authorization key specifies the maximum number of authorized IPs as two. The authorization key also uniquely identifies IP0 and IP1 as being the IPs that are available for use. As a result, six of the IPs in the system initially remain unused.

In one embodiment, a corresponding configuration file (not shown) is provided to map the identifiers "IP0" and "IP1" specified in the authorization key to specific hardware within the system. For example, a configuration file may correlate the name "IP0" with IP 80A of sub-POD 50A by identifying a slot and chip location that is populated by IP 80A.

As discussed above, SCPF 90 is a software utility that is provided to control which IPs are enabled, as well as the peak performance level that is allowable for each of the enabled IPs. If the customer attempts to enable, or "up", any of the processors other than IP0 and IP1, SCPF will issue a warning message and prevent the enabling of the identified IP.

The exemplary authorization key of FIG. 2A allows each IP to run at 80% of its maximum performance level. To control this level, the SCPF utility will cause IP0 and IP1 to enter a forced idle state for a specified percentage of time, which in this case is 20%. This forced idle state is preferably achieved at the expense of non-critical system and user activities. The processing of critical system events such as interrupts, including pre- and post-processing of I/O interrupts, memory paging, and so on, are preferably not delayed during forced idle states. The forced idle state is enforced on an IP basis rather than a system wide basis.

The forced idle state may be implemented using the multitasking capabilities of the system. As is known in the art, a multitasking environment allows an IP to execute multiple tasks, with each task being executed during a predetermined quantum of time. After the time for execution of a given task expires, the OS causes the IP to begin executing another task for the next quantum of time, and so on.

To facilitate multitasking, the OS must re-gain control of the IP at somewhat regular time intervals. This can be accomplished in a number of ways. Generally, a task that is executing on an IP periodically requests a service from the OS, thereby relinquishing control. This can be used as an opportunity to allow the OS to initiate execution of another task on the IP. Occasionally, however, a task may execute for long periods of time without relinquishing control to the OS. To prevent such execution from continuing for an extended period of time, the OS uses a quantum timer such as timer 81A to regain control of the IP. If a task continues execution beyond its allocated quantum of time, the quantum timer will expire to interrupt task execution. Control is returned to the OS so that another task can begin execution.

The foregoing environment may be utilized to scale performance of an IP as follows. When the OS gains control after task execution has been interrupted in any of the ways described above, SCPF 90 may, if necessary, force the IP to execute in a looping construct in which no useful work is done. The amount of time spent in the forced idle loop will be adjusted as necessary to cause the partition to run at a predetermined performance level specified by the system authorization key. SCPF monitors a system clock to cause the IP to execute within the idle loop until the predetermined scaled performance level is achieved. Preferably, the increments of time spent within a forced idle state are sufficiently small so as not to be discernable by a user. After the time required for execution within the forced idle loop has elapsed, the IP may be directed to resume execution of the next scheduled processing task. This will be discussed further below in reference to FIG. 7.

Next, assume the customer is experiencing a workload that cannot be adequately handled by the normal authorization key. To address this situation, the customer may purchase an optional authorization key.

FIG. 2B is an exemplary prior art optional authorization key. Like the key shown in FIG. 2A, this key includes a model and serial number of the target data processing system, an IP identifier field indicating the IPs that are available for use, and the maximum performance utilization allowed for those authorized IPs. This key may increase the number of IPs authorized for use, and/or the maximum utilization percentage for the authorized IPs. For example, the key of FIG. 2B indicates that any four IPs may be utilized at a processing rate of 100%.

An optional key is generally adapted for relatively short-term use as compared to a normal authorization key. In a manner similar to normal keys, this type of key may include an expiration date and/or a maximum usage time. For example, the key of FIG. 2B is valid for a period of ten days, and expires on Jan. 1, 2004. In a preferable embodiment, the optional authorization key can be used cumulatively for ten days, and need not be used for ten consecutive days. Once the expiration date of the optional authorization key arrives, or the key is used for more than ten days, SCPF 90 automatically returns the data processing system to the original configuration, which may be governed by the use of a normal authorization key such as that shown in FIG. 2A. In one embodiment, SCPF provides one or more messages to the customer, warning the customer of the impending configuration change. This may give the customer the opportunity to purchase an additional optional authorization key before the data processing system is returned to the original configuration.

As can be appreciated by the foregoing, the use of an optional authorization key is particularly suited for a situation wherein a customer is experiencing a short-term workload increase. If it is anticipated that the increased workload will be sustained, the customer may purchase a normal authorization key that increases system performance for a longer time period.

The prior art system and method discussed above provides a flexible approach to increasing the performance of the system without disrupting normal operations. Moreover, the performance level increase may be tailored to a customer's specific needs. The customer is only required to purchase the amount of additional processing power for the limited time that processing power is needed. While this provides significant advantages, the flexibility of the prior art system may be improved. For example, prior art normal authorization keys specifically identify the IPs that are available for use. As a result, the customer does not have the discretion to disable one IP and instead employ a different IP, as may be desirable if a failure occurs within one of the executing IPs.

Another aspect of the prior art system involves the way in which the performance level is specified. As previously discussed, a key describes the purchased processing power in terms of the number of processors that are available for use, and the percentage of utilization for each of the available processors. However, in some system configurations, these specifications do not necessarily accurately describe a predetermined level of performance.

The foregoing observation can be appreciated by considering the optional authorization key of FIG. 2B. This key allows a user to employ any four IPs at 100%. However, in an exemplary system such as shown in FIG. 1, the user will obtain different processing throughput levels based on which IPs are selected for use. For example, if IPs 80A-80D within sub-POD 50A are employed, the user will obtain significantly better performance than if two IPs are utilized in sub-POD 50A, and two IPs are enabled in sub-POD 50B. This is the result of performance benefits obtained when all IPs execute from the same shared cache 70A. Thus, a customer may obtain two different work capacities from the same prior art authorization key. The performance level obtained will depend upon the hardware employed by the customer. This drawback may be addressed by specifically identifying the IPs that are available for use in a manner similar to that shown in FIG. 2A. However, this restricts the user's ability to make hardware substitutions when faults are detected, as is discussed above.

Another concern associated with prior art systems involves the use of processing partitions. As discussed above, a partition is comprised of resources that are allocated to execute in a cooperative manner to perform one or more assigned tasks. For example, a partition may be created that includes one or more predetermined IPs, IOPs, and a predetermined memory range within MSU 10. A second partition may be defined to include different IPs, IOPs, and another memory range. Each of these partitions may operate independently to execute respectively assigned tasks in parallel with those tasks being executed by other partitions. Partitions may be re-defined as system requirements change.

Some prior art keys are "partitionable", meaning these keys support the use of partitioning. Partitionable keys can be activated in a single partition, or in multiple partitions. For example, assume a partitionable key authorizes the use of six identified IPs. All of these IPs may be allocated to the same partition. Alternatively, two partitions may be created, each including three of the identified processors.

Prior art partitionable keys do not take into account performance differences between various partitioning alternatives. For example, two partitions that each includes three IPs deliver considerably more processing power than a single partition that includes six IPs. Thus, it is difficult to price a partitionable key fairly.

Aspects of the prior art system discussed above are addressed by the current invention, which is a system and method for scaling the performance of a system by specifying the total performance level being purchased, rather than the number of processors that will deliver the processing power.

The performance level describes the amount of work that can be accomplished by the system in a predetermined period of time. The performance level can be described in a number of different ways. One familiar metric measures the performance level in Millions of Instructions Per Second (MIPS). The MIPS ratings for a data processing system can be established by measuring the execution time of various benchmark programs. As is known in the art, a suite of benchmark programs is generally developed specifically for a particular system architecture and operating system. Thus, a particular set of benchmarks does not necessarily provide data that can be used to conduct a meaningful comparison between two machines having different architectures. However, a given suite of benchmarks can provide meaningful comparison data when considering the performance of systems that are included within the same or related product families.

The throughput of systems such as the ClearPath plus CS7802 system commercially available from Unisys Corporation is established using a suite of benchmark programs analyzed by International Data Corporation (IDC). These programs measure throughput in a unit of measure referred to as "IDC MIPS", which hereinafter, will just be referred to as "MIPS" for simplicity.

According to one embodiment of the invention, authorization keys are provided to enable a predetermined number of MIPS within a data processing system. The customer is free to choose the identity and quantity of the IPs that will be enabled to achieve this performance level. The customer is further able to choose how these processors are partitioned. The inventive system and method takes into account both architectural characteristics associated with the data processing system as well as the performance level achieved by a selected partitioning configuration when scaling performance to obtain the predetermined MIPS rating.

FIG. 2C is an exemplary authorization key according to the current invention. Like the keys illustrated in FIGS. 2A and 2B, this key includes a model and serial number of the target data processing system. The key may further include an expiration date and/or a maximum usage time. Unlike the keys shown in FIGS. 2A and 2B, however, this key specifies a maximum performance level, which is shown to be 450 MIPS in FIG. 2C. This performance level describes the maximum performance that may be obtained by the system on which the key is installed. This performance level is not correlated with one or more specified IPs, and does not necessarily dictate the performance that will be obtained from any of the IPs within the system. This will be discussed further below in reference to the remaining drawings.

FIG. 3 is a table illustrating the number of MIPS that are delivered when various combinations of IPs are enabled at 100% utilization within a system such as that illustrated in FIG. 1. It will be understood that the listed MIPS ratings are not intended to reflect actual performance capabilities of any commercially available system, but are presented merely for discussion purposes. A review of this table indicates that any IP 80 within the system of FIG. 1 delivers 200 MIPS when executing at 100% utilization. Similarly, 500 MIPS are delivered by three IPs that are executing at 100% within the same sub-POD 50. Four IPs residing within one sub-POD deliver 630 MIPS, whereas four IPs residing in two different sub-PODs provide 550 MIPS. Eight IPs executing in two sub-PODs deliver 900 MIPS. It may be noted that this is much less than the nominal 1600 MIPS that would be obtained from eight IPs executing individually at 200 MIPS. This is so because of the multiprocessor effects associated with the system's cache architecture and the benchmarking software's use of shared data. It will be appreciated that for a system such as that shown in FIG. 1 or even larger, a table of the type illustrated in FIG. 3 will have many more entries to reflect all of the different IP combinations that are possible within the system.

The table of FIG. 3 provides MIPS rating for processors within the same partition. For example, the rating of 900 MIPS for eight IPs refers to the maximum performance level obtained when all eight IPs are allocated to the same partition. As discussed above, however, processors need not be allocated to a single partition. For example, eight IPs may instead be allocated to two partitions, each including four IPs running within the same sub-POD. In this case, the MIPS rating for each partition is obtained from the third table entry, which lists a single partition including four IPs as being rated at 630

MIPS. Thus, two partitions of four processors provide a total of 1260 MIPS, which is higher than the 900 MIPS obtained from the single-partition configuration. Using a table such as shown in FIG. 3, the differences between performance levels of various partition configurations may be taken into account, as discussed below.

The way in which FIG. 3 is used to scale performance may best be understood by example, as follows. Assume that a customer has a system similar to that shown in FIG. 1, but which includes only two sub-PODs 50. Each sub-POD is populated by four IPs 80 for a total of eight IPs in the system. Further assume that the customer purchases a 450-MIPS key. The customer is allowed to utilize as many IPs as desired, so long as the total performance does not exceed 450 MIPS.

Next, suppose that during the day, the customer chooses to deploy all eight IPs in the same partition. The customer may desire to employ this "eight-way" single partition configuration because it provides the best response times when multiple users are submitting requests within a transaction-processing environment. As illustrated by the fifth entry of FIG. 3, this type of configuration has a rated maximum performance of 900 MIPS. Since the customer's key is rated for 450 MIPS, the performance of the system must be scaled by a factor of 450/900, or 50 percent. Thus, each IP must be in a forced idle state 50 percent of the time. This is accomplished by forcing the IP to execute within a looping construct that does not perform any useful function. The IP monitors a system clock while executing within the looping construct to thereby control the amount of time spent in the idle state. After the predetermined idle time has elapsed, the IP is again allowed to resume executing scheduled processing tasks.

Assume further that in the evening, the customer chooses to transition to an overnight batch mode wherein system-critical tasks are processed in a serial manner. By their nature, some of these tasks are single-threaded and must be executed consecutively. To better accommodate these types of tasks, five of the eight processors that were running in the partition are disabled, or "downed". Only three IPs remain executing within the partition. From the second entry of FIG. 3, it can be seen that the maximum performance level of this "three-way" partition is 500 MIPS. To achieve a performance level of 450 MIPS, the system performance must be scaled by a factor of 450/500, or go percent. Therefore, each IP is forced into an idle state 10 percent of the time. When the batch mode tasks have completed, the remaining five IPs may be re-enabled to again provide the transaction-processing configuration that is more suitable for the daytime multi-user environment.

It may be noted that in reality, processors are enabled and disabled individually, so the system's performance level changes incrementally as the transition from an 8-way to a 3-way configuration occurs, and vice versa.

The above example involves a single partition. Similar considerations are employed when scaling performance when multiple partitions are involved. For instance, assume that the customer of the current example wants to utilize the 450 MIPS key to scale a system that is executing multiple partitions. Recall that the customer has a system similar to that of FIG. 1 that includes two sub-PODs, each populated with four IPs. Further assume that in the system of FIG. 1, partitions can only be created on sub-POD boundaries. Therefore, the customer may utilize a configuration having, at most, two partitions, each including a sub-POD populated by four IPs.

Next, assume that the customer desires to run an important application in a first partition while the less critical applications execute in the other partition. To ensure that sufficient processing power is available for the critical task, the customer chooses to allocate 300 of the 450 MIPS to the first partition. In one embodiment, this type of allocation may be performed using a predetermined operations or administration screen available on system console 95. This type of allocation may be subject to limits imposed by the system administrator.

After the allocation of MIPS to a partition has been performed, scaling factors may be calculated. For example, assume that all four IPs in the first partition are enabled. Therefore, the maximum rated performance of the first partition is 630 MIPS, as shown in the third entry of FIG. 3. Therefore, SCPF 90 will scale execution of each IP in the first partition by a factor of 300/630, or 48 percent.

Next, the remaining 150 MIPS that have not been allocated to the first partition are automatically allotted to the second partition so that all available processing capability is utilized. Assume that in this other partition, three IPs are enabled. This partition therefore has a maximum rated performance of 500 MIPS. SCPF 90 therefore scales the performance level of the partition to 150/500, or 30 percent, by scaling each of the processors in the partition to 30 percent of maximum potential.

As can be appreciated by the foregoing examples, the current system and method allows IP performance levels to vary between partitions. For instance, the IPs of the first partition execute at 48 percent of maximum, whereas the IPs in the other partition are executing at 30 percent of maximum capacity.

In addition to varying the performance levels between partitions, it is also possible to scale the performance of IPs within the same partition to different levels. However, because the IPs of a given partition are operating on the same tasks and may be sharing and/or passing data through shared memory in MSU, 10, processing power is generally most efficiently utilized by distributing it evenly between the IPs of the same partition. For this reason, in one embodiment, all IPs with the same partition are scaled by the same scaling factor.

According to one embodiment of the invention, warning messages may be provided if a partition cannot achieve a desired performance level. For example, if a user or an automated process attempts to allocate 600 MIPS to a partition having 3 IPs in one sub-POD, a warning message will be provided indicating the maximum processing power that may be allocated to this partition is 500 MIPS. In such situations, SCPF 90 will allow each IP in the partition to execute at 100 percent, and all remaining MIPS will be available for allocation to one or more other partitions.

According to another aspect of the system, a warning message will be issued if the performance level of an IP is scaled below a predetermined minimum value. This warning is provided because, in one embodiment, the forced idling mechanism does not operate in a predictable manner when an IP is scaled below a certain performance level. In this case, SCPF 90 may be configured to automatically disable one or more processors until the remaining processors are executing at, or above, the predetermined minimum processing level. For example, assume the minimum scaling factor is three percent, and the customer attempts to run eight IPs in a partition that has been allocated a performance level of 20 MIPS. SCPF will continue disabling IPs until only three IPs are running in the partition. This results in a scaling factor of 20/500, or four percent, exceeding the minimum scaling factor, and allowing the 20 MIPS to be predictably supported. This is discussed further below in reference to FIG. 7.

The foregoing approach can be used to scale performance levels on a short-term, or a more long-term, basis. That is, both normal and optional performance keys may be rated based on MIPS. In a manner similar to that described above with respect to FIGS. 2A-2C and 3, both normal and optional authorization keys may be associated with an expiration date and/or a maximum time of use. In one embodiment, SCPF 90 tracks both the total time of use and expiration date for these keys. When the expiration date arrives, or when the authorized time has been used, SCPF will disable the key. If the customer possesses both normal and optional authorization keys when an optional key expires, SCPF will transition the system to a performance level associated with the normal authorization key.

Figure 4A:
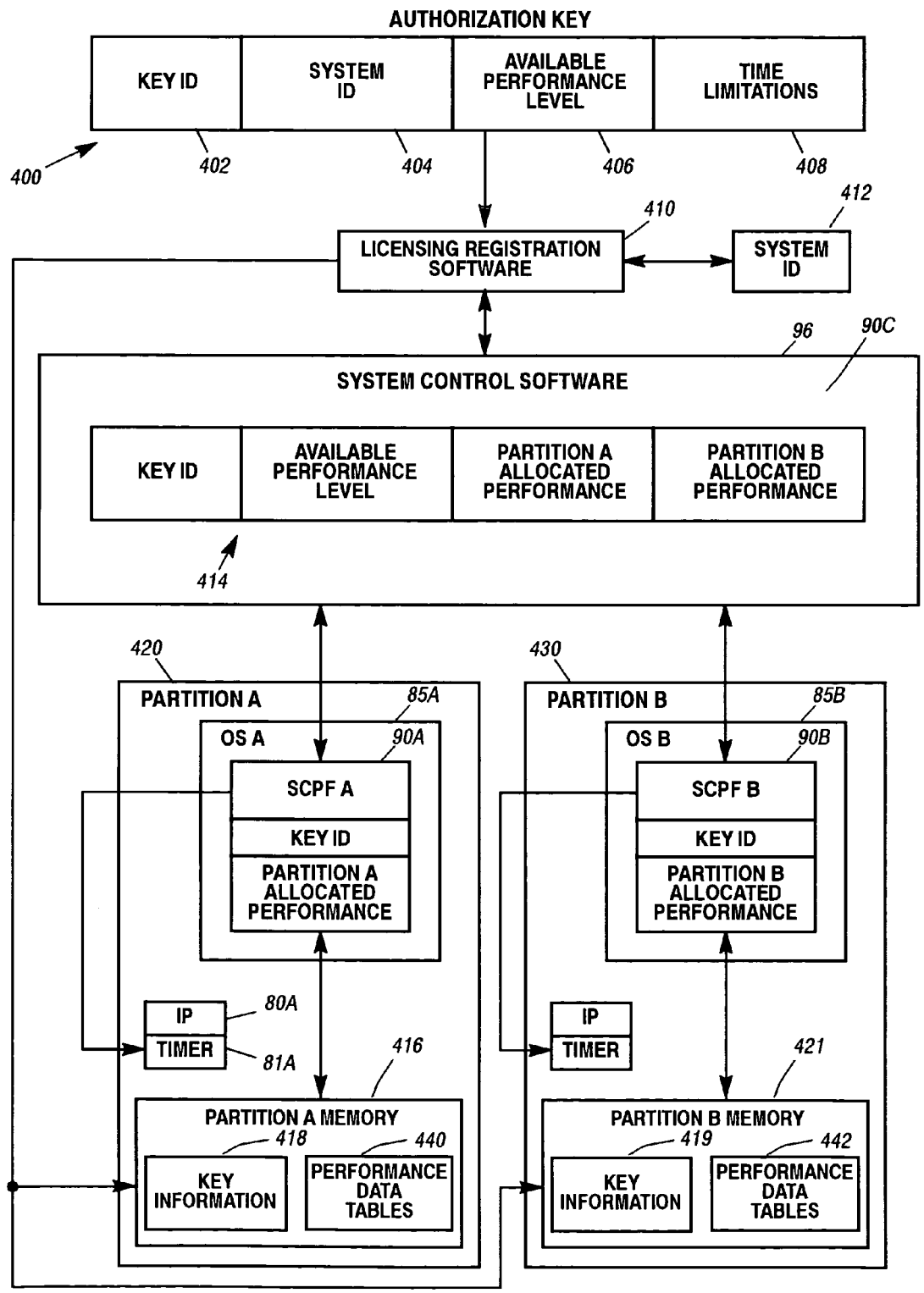
FIG. 4A is a block diagram illustrating one embodiment of the inventive system wherein the Software Controlled Performance Facility is included within the kernel of the operation system.

FIG. 4A is a block diagram illustrating one embodiment of a system for allocating performance levels in the manner discussed above. An authorization key 400 is provided to the user on a tape, an email transmission, disk, or via some other medium. This key may be uniquely identified by a key identification field 402. The key may further include a system identification field 404 that stores a serial number or other identification data associating the key with the system on which it will be utilized. Finally, the key stores an available performance level 406, and any time limitations 408 associated with the key such as expiration date and maximum time of use.

The authorization key is registered with the system using a software utility that tracks licensing data, shown as licensing registration software 410. This software verifies that the data stored within system id field 404 of the key matches identification data 412 provided with the system. Such system identification data may be stored within a read-only memory or some other storage device, may be hardwired on a back panel, manually or automatically selected using switches, or provided in any other suitable way.

Key information may also be copied to memory available to system control software 96, as illustrated by key data 414, such as memory within system console 95 shown in FIG. 1. In one embodiment, system control software may retain information describing more than one authorization key. This may be desirable, for example, if a customer purchases both normal and optional keys that are both registered on the same data processing system.

Next, system control software 96 may be used to create one or more processing partitions. Specifically, an operator may employ maintenance screens provided by system control software to select the hardware that is to be added to a given partition. In response to this selection, system control software 96 employs scan interface 97 to enable and/or disable the appropriate hardware interfaces, including memory, cache, and processor interfaces. This electrically isolates the hardware of one partition from another, while allowing the various IPs, caches, and memories of the same partition to function as a unit. IPs that are included within a partition are enabled to communicate with their respective shared cache, whereas IPs that are not being used are electrically isolated from their respective shared cache and are not executing until such time as they are enabled. As discussed above, in one embodiment, the hardware of FIG. 1 must be partitioned on sub-POD boundaries. That is, hardware from the same sub-POD may not be included within two different partitions.

After system control software 96 configures hardware and allocates one or more memory ranges within MSU 10 to a partition such as partition A 420, an instance of the OS 85 is booted within the allocated memory range(s). For example, an instance of the operating system, shown as OS A, 85A, is booted in partition A 420. In this embodiment, OS A includes as part of its kernel an instance of SCPF, shown as SCPF A, 90A. The partition also includes at least one IP 80A, which has a quantum timer 81A that is used to facilitate multitasking.

Sometime before or after the OS is booted, key information 418 including the maximum available performance level provided by the performance key is copied to partition A memory 416. Partition A memory is a range of memory within MSU that is directly accessible to partition A. OS A will read the key information from a known location within partition A memory to obtain the performance level provided by the registered key.

In one embodiment, the OS will, by default, attempt to obtain the entire performance level of the key. For example, if the key provides a maximum performance level of 450 MIPS, SCPF a included within OS A 85A will attempt to obtain the entire 450 MIPS. SCPF A then issues a message to system control software 96 indicating that the entire 450 MIPS has been obtained. If the entire 450 MIPS was available for allocation, system control software 96 updates the authorization key data 414 to record that partition A is executing at a performance level of 450 MIPS. OS A then notifies SCPF A that the performance level is allowable. SCPF A will thereafter scale performance of the IPs within the partition to achieve this performance level, as will be discussed further below.

In a manner similar to that described above, an operator may utilize system control software 96 to create an additional partition B 430. Memory within MSU 100 that is accessible to this partition is shown as partition B memory 421. Sometime before or after an instance of the OS is booted within partition B, key information 419 is copied to partition B memory. This key information includes the maximum available performance level 406 provided by the key.

An instance of the OS, shown as OS B, 85B, is booted in this additional partition B. OS B reads the key information 419 from partition B memory 421 and attempts to obtain all of the 450 MIPS provided by the key. SCPF B, 90B, issues a message to system control software 96 indicating that partition B is currently set to a performance level of 450 MIPS. System control software 96 utilizes key information 414 to determine that 450 MIPS have already been allocated to partition A 420. System control software returns an error message indicating that no MIPS are available for use, and partition B will be halted.

The foregoing discusses one embodiment wherein an OS always attempts to obtain all available MIPS provided by the authorization key upon completing the boot process. In this embodiment, some type of intervention is required to allow multiple partitions to be employed. For example, according to one aspect, OS A provides a display screen on system console 95 that is available to an operator for entering performance data. The operator may utilize this screen to send a message to SCPF A, 90A, indicating that partition A is to operate at something less than the entire 450 MIPS. Any time after OS A is booted, for instance, the operator may send a message to SCPF A indicating that partition A is to run at 200 MIPS. Upon receipt of this message, SCPF A stores this performance data within key information 418, and modifies performance of the partition accordingly. In addition, SCPF A sends a message to system control software 96 indicating the performance level of partition A has been modified, and system control software 96 updates the authorization key data 414 to reflect that partition A is now running at 200 MIPS.

Next, assume that partition B is created and OS B 85B attempts to obtain all 450 MIPS. OS B issues a message to system control software 96, which determines that only 250 MIPS of the 450 MIPS are available for use. System control software records that 250 MIPS are being allocated to partition B, and returns a message to OS B indicating that partition B must run at 250 MIPS. SCPF B records that partition B will execute at 250 MIPS, and thereafter scales performance of the IPs in the partition to achieve this performance level.

SCPF A has access to one or more performance data tables 440 stored within partition A memory 416. Similarly, SCPF B has access to one or more performance data tables 442 residing within partition B memory 421. These tables, which are similar to that shown in FIG. 3, store data that is specific to the configuration, and which is used to scale IP execution in the manner discussed herein.

System configurations and performance level allocations may be changed, as discussed above. For example, an operator may change the amount of processing power that is allocated to a given partition, so long as the total processing power used by all partitions does not exceed the maximum performance level specified by the registered key. Similarly, an operator may change the configuration of a partition by enabling or disabling IPs in a sub-POD included within the partition. When either of these events occurs, SCPF re-calculates the amount of time each IP must spend in a forced idle loop to achieve the allocated performance level for the partition.

The above examples describe one embodiment wherein the instance of SCPF included within an OS attempts to obtain all processing power provided by an authorization key when the OS is booted. In another embodiment, performance data may be stored with key information to cause SCPF to attempt to obtain a different performance level. For example, performance information may be stored within key information 418 of partition A memory 416 indicating that partition A should optimally obtain 200 MIPS. When OS A is booted, SCPF A will read this key information from memory 416, and will attempt to obtain the optimal performance level of 200 MIPS. A message will be issued to system control software 414, and system control software will determine whether this performance level is available for allocation in the manner discussed above. If this performance level is not available, system control software 96 will return a message to SCPF A that specifies the performance level that is available. SCPF A will set the performance of the partition to this available level.

In one embodiment, key information 418 will include the minimum performance level that is desired for optimal operation of the partition. This minimum performance level, which is configured by the customer, specifies the minimum level of performance that must be allocated to the partition to allow that partition to continue completing processing tasks in an optimal manner. For example, it may be beneficial to assign this type of minimum performance level to a partition that is performing high-priority work as a guarantee that enough processing power is available within the partition to allow the work to complete in a timely manner. If this type of minimum performance level has been assigned to a partition, and if system control software 96 returns a message to partition A indicating the performance level available to that partition is less than this assigned minimum performance level, the SCPF will issue periodic warning messages to the system operator. These messages will be provided to a display screen on system console 95 to warn the operator that the partition is not running at the optimal level.

The foregoing discussion describes situations wherein the authorization keys are registered before partitions are created and the OS instances are booted. In another embodiment, this is not a requirement. In a scenario wherein a key is registered after partition creation, the partition will stop executing if a key is not registered within a certain period of time thereafter. When the key is registered, key information is copied to memory accessible by that partition, such as key information 418 for partition A, and key information 419 for partition B. A message is issued to the SCPF of each partition, which will then set the performance level of its partition using the key information and information provided by system control software 96 in the manner discussed above.

Figure 4B:
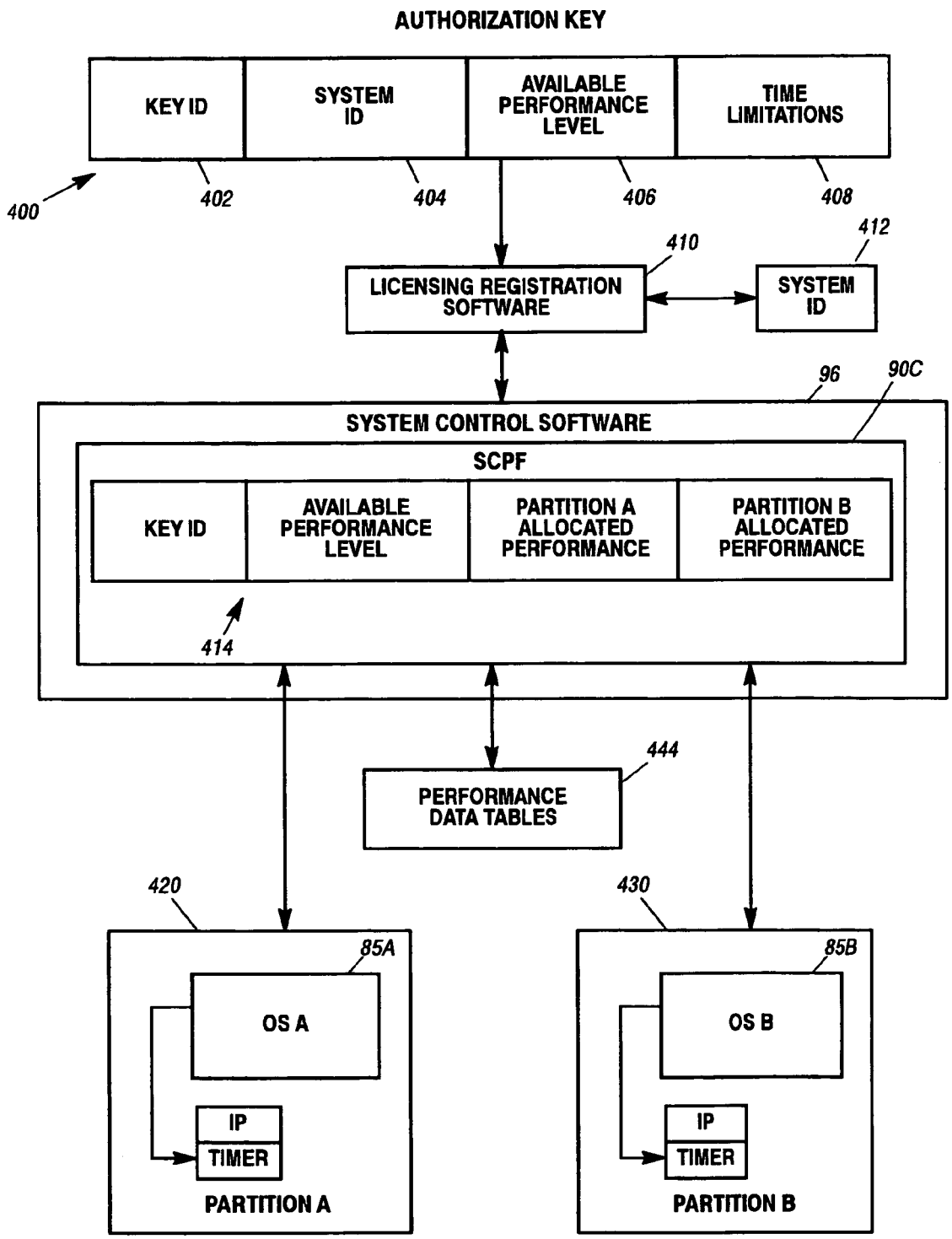
FIG. 4B is a block diagram illustrating another embodiment of the current invention wherein the Software Controlled Performance Facility is a centralized entity.

FIG. 4B is a block diagram illustrating yet another embodiment of the current invention. Elements similar to those shown in FIG. 4A are assigned like numeric designators. In this embodiment, SCPF 90C is incorporated within system control software 96 rather than being included within the kernel of the OS. Additionally, all key information 414 and the one or more performance data tables 444 are retained within memory that is accessible to SCPF 90C, but which is not directly accessible by any created partition.

The system of FIG. 4B operates in a manner similar to that discussed above. An operator creates a partition using system control software 96. Next, the operator may employ a screen provided by SCPF 90C on system console 95 (FIG. 1) to allocate a performance level to the newly created partition. If this performance level is not allowed for reasons set forth above, SCPF provides the operator with a warning message indicating, for example, that the specified performance level exceeds the level remaining on the key. When an acceptable performance level has been selected for a partition, SCPF 90C stores this performance allocation in authorization key information 414. SCPF records all allocations made for each partition associated with the key.

After a partition is configured, SCPF 90C tracks processing time for each IP in a manner similar to that performed by SCPF 90A and 90B. In this embodiment, SCPF 90C controls the performance level of each partition by informing an SCPF agent included within the partition's OS to enforce the allocated performance level for the partition. This agent then scales the performance of each of the IPs in the partition appropriately. The manner in which IP performance is scaled is discussed further below.

Figure 5:
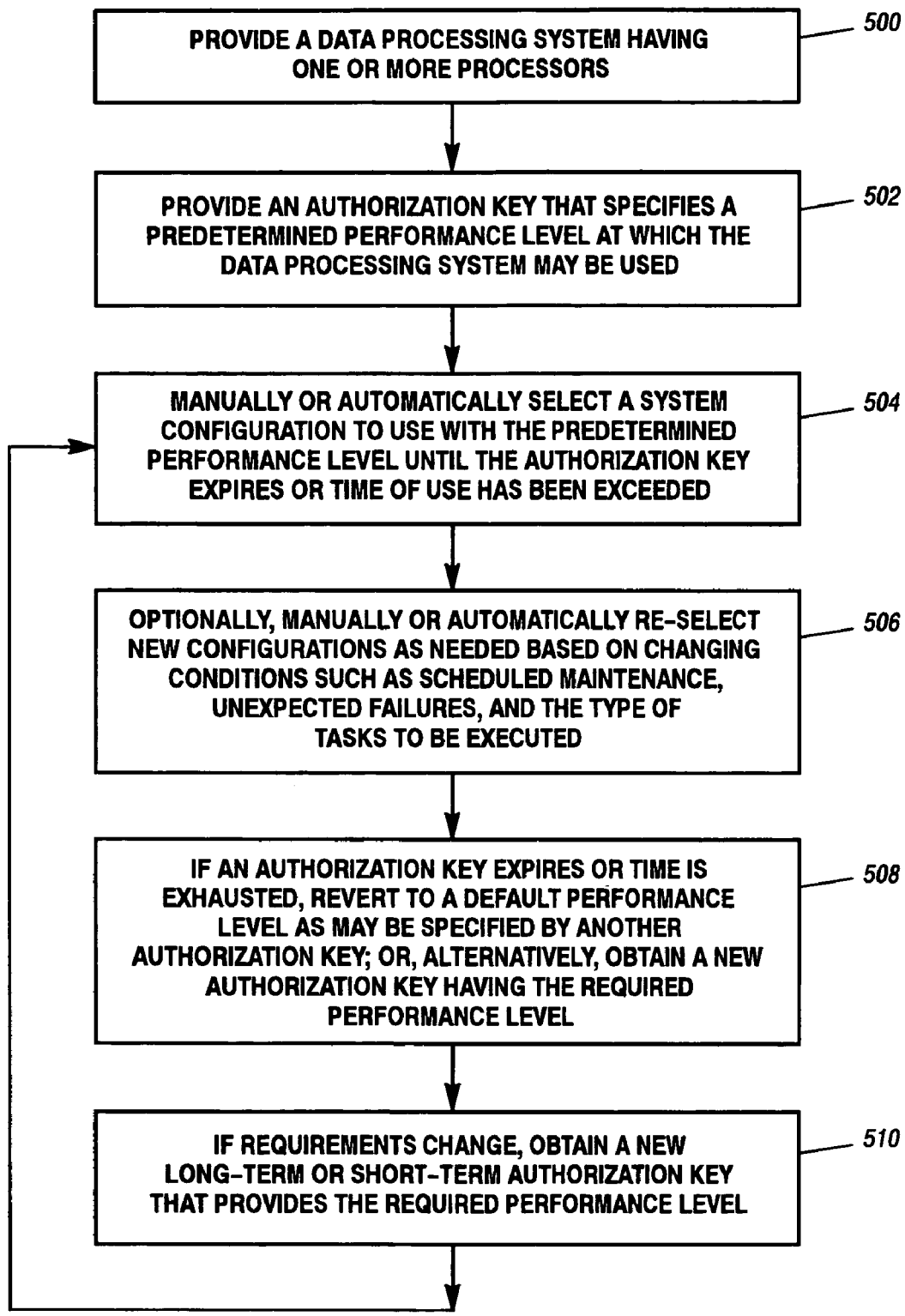
FIG. 5 is a flow diagram illustrating one embodiment of a method according to the current invention.

FIG. 5 is a flow diagram illustrating one embodiment of a method according to the current invention. A data processing system is provided that includes one or more IPs (500). The customer obtains an authorization key that specifies a predetermined performance level at which the data processing system may be used (502). In one exemplary embodiment, the level of performance is specified in MIPS. However, it will be understood the performance level may be described using any other suitable metric.

The authorization key may be a normal key that is to be used for a relatively long period of time, or may be an optional key that is generally used for a shorter time period. In one embodiment, the performance key may be delivered with the system. For example, the key may be registered on the system before the system is delivered. In another embodiment, the performance key may be provided to the customer after the system has been installed at the customer site. The performance key may be provided to the customer on a tape, disk, via an email transmission, or using any other suitable mechanism. The customer will register the key on the system and any system identification provided with the key will be verified during the registration process in the manner discussed above.

Once the key has been registered, the customer may select a system configuration to use with the predetermined performance level (504). This may be performed using system control software 96. In general, any one of multiple configurations will be available for use with the performance level. For example, the customer may select the desired configuration based on the type of processing tasks that will be executed on the data processing system.

At any time, the customer may re-select a new configuration based on changing conditions (506). These conditions may include the scheduling of system maintenance, the occurrence of unexpected failures, or a change in the type of processing tasks to be executed on the system. If desired, the configuration may be modified automatically. For example, this could be accomplished using functionality embodied within software executing on system console 95.

In one embodiment, a console program such as the Single Point of Operations console application commercially available from Unisys Corporation may be used to automatically select the configuration. This type of automated configuration change may occur at predetermined times of the day or based on monitored system conditions. For instance, one configuration may be selected for executing processing tasks in batch mode during the evening, whereas a second configuration may be selected to support a transaction-processing environment during the workday.

If an authorization key expires, or the time associated with the key is exhausted, the performance level may transition to that specified by a different key (508). For example, if a normal key has been registered with the system at the time an optional key expires, the system will begin operating at a level associated with the normal key. This transition may occur automatically under the control of SCPF 90 and system control software, or may be performed manually by the customer after a warning message has been issued regarding the termination of the optional key. Otherwise, if another key has not been registered on the system when expiration occurs, the system will terminate processing activities. The system will then need to be re-booted and a new key registered to resume processing activities.

As performance requirements change, the customer may obtain a new key (510). This key may be a long-term or short-term key, and may provide an increased or decreased performance level as compared to the previous key, depending on the changing requirements of the customer. Using this new key, the customer may select a system configuration to use with the predetermined performance level specified by the new key (504), and the process may be repeated.

Figure 6:
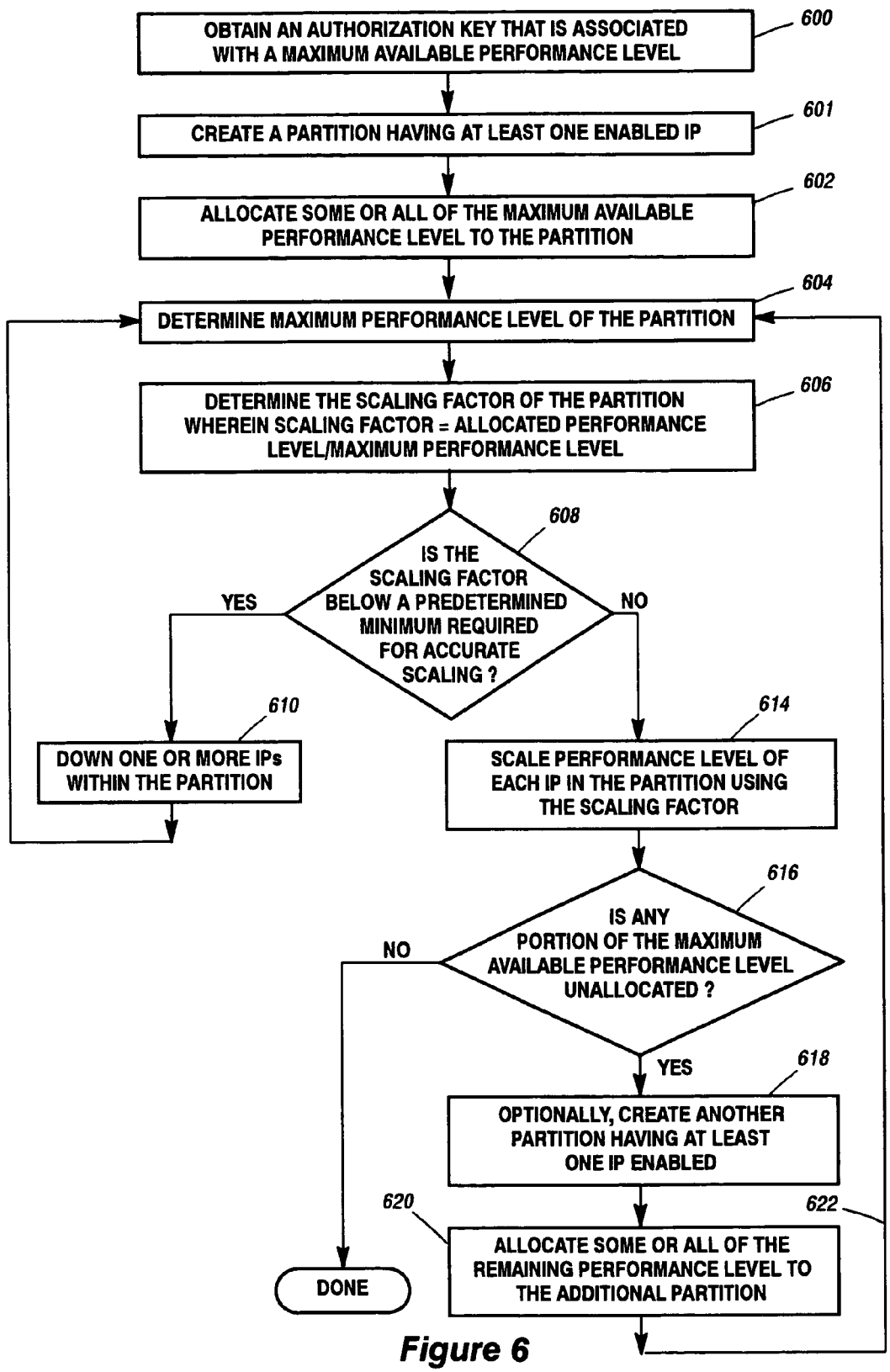
FIG. 6 is a flow diagram illustrating one embodiment of a method of scaling performance of a system according to the current invention.

FIG. 6 is a flow diagram illustrating one embodiment of a method of scaling performance according to the current invention. According to the method, a maximum available performance level is obtained, as by purchasing an authorization key (600). As discussed above, this performance level may be specified in MIPS or in some other unit of measure that is suitable for describing the performance of a data processing system. A partition is created having at least one enabled IP (600). Some or all of the maximum available performance level that is provided by the authorization key is allocated to the partition in one of the ways discussed above in reference to FIGS. 4A and 4B (602). The selected partition configuration is used to determine the maximum possible performance of the partition (604). This can be accomplished using one or more tables such as the table shown in FIG. 3. The scaling factor of the partition may then be calculated using the following equation, as shown in step 606:

Scaling factor=(allocated performance)/(maximum performance)

Next, it may optionally be determined if the scaling factor is below a predetermined minimum level (608). As discussed above, in one embodiment, accurate performance scaling cannot be performed if an IP is running below a predetermined minimum performance level. In one embodiment, the predetermined minimum level used during this verification step may be programmably selected.

If the scaling factor is below the predetermined minimum value, one or more IPs may be disabled, or "downed", within the partition (610). The new scaling factor for the partition may again be determined. This may be accomplished by again consulting the look-up table to determine the new maximum performance level of the partition, then calculating the new scaling value, as shown in steps 604 and 606. If the scaling factor is again below the predetermined minimum level (608), the process is repeated until the scaling factor exceeds the minimum value, or it is determined that an insufficient performance level remains to support execution of the partition. In the latter instance, the partition is halted.

Next, the performance of each IP is scaled using the scaling factor (614). When the OS gains control because execution of a task has been interrupted either because of quantum timer expiration, because an executing task requested a service of the OS, or for another reason, SCPF 90 may force the IP into an idle loop. This may be necessary to cause the partition to run at a predetermined performance level. SCPF monitors a system clock to cause the IP to execute within the idle loop until the predetermined scaled performance level is achieved, as will be discussed further below.

If any portion of the maximum available performance level specified by the authorization key is unused (616), the user may optionally create another partition having at least one IP (618). Some or all of the remaining performance level may be allocated to the additional partition (620), and the process may be repeated, as shown by arrow 622. In one embodiment, if the user creates a partition that is not assigned a specific MIPS value, SCPF 90 will automatically allocate all remaining processing power to that partition, as discussed above. The process of FIG. 6 may be repeated for more than two partitions, so long as the total processing power allocated to all partitions does not exceed that specified by the authorization key.

Figure 7:
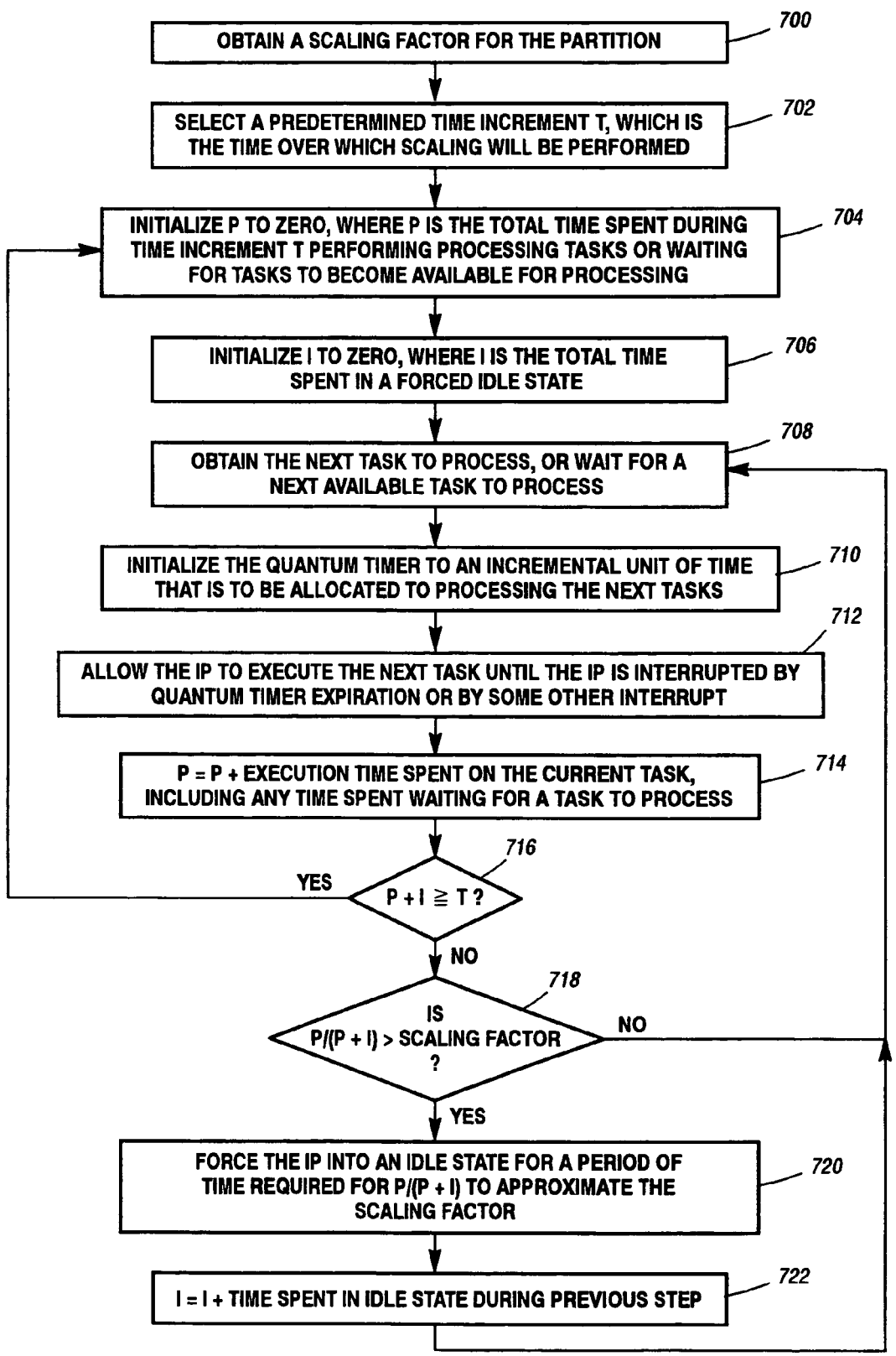
FIG. 7 is a flow diagram of one embodiment of scaling performance of an instruction processor according to the current invention.

FIG. 7 is a flow diagram of one embodiment of scaling an IP according to the current invention. This scaling operation may be controlled by SCPF 90 or some other entity in any of the ways discussed above. First, a scaling factor is obtained for scaling the performance of a partition (700). This scaling factor may be determined in a manner illustrated in FIG. 6, for example. A predetermined time increment "T" is then selected, which is the time increment over which scaling will be performed (702).

Next, variables "P" and "I" are initialized to zero (704, 706). Variable "P" records the total time spent during any time increment "T" either processing work, or waiting for work to be available for processing. Variable "I" records the total time spent during time "T" in a forced idle state imposed to achieve a specified performance level.

After variable initialization is complete, the next queued task is obtained for processing (708). This task may be obtained from a queue of tasks awaiting execution on the current IP, for example. If no such task is available, the system waits for task availability.

After a task is identified for execution, various IP registers must be initialized using environment data stored when the task was last executed by the IP. As is known in the art, this type of data may be stored within a stack entry or some other storage structure. The IP's quantum timer is also initialized for use in interrupting the task, if necessary, to return control to the OS after a maximum quantum of time allotted to the task has expired (710).

Next, the IP is allowed to execute the next task until the IP is interrupted by expiration of the quantum timer or another interrupt, or by the task returning control to the OS (712). Variable "P" is updated to include the time spent during the previous steps waiting for the task to become available, if necessary, then processing the task (714). A check is then made to determine whether time period "T" has expired (716). Expiration of time "T" occurs when the sum of the time "P" and the total forced idle time "I" is greater than, or equal to, time "T". If time "T" has expired, the process is repeated starting at step 704.

Returning to step 716, if time "T" has not elapsed, it is determined whether the percentage of time spent during time period "T" either processing tasks or waiting for tasks to become available for processing exceeds the scaling factor for the partition (718). This check is made by determining whether the ratio P/(P+I) is greater than the scaling factor. If so, the IP is forced to enter an idle state for the time period necessary for P/(P+I) to approximate the scaling factor (720). SCPF accomplishes this by monitoring a system clock to determine when enough time has elapsed so that time stored in variable I results in P/(P+I) approximating the scaling factor. Next, the total time spent in a forced idle state, "I", is updated by the forced idle time elapsed during the previous step (722). Then the IP may again be allowed to begin executing the next scheduled task in step 708.

Having thus described the preferred embodiments of the present invention, those of skill in the art will readily appreciate that the teachings found herein may be applied to yet other embodiments. For example, any data processing system may utilize the invention described herein to scale performance. The systems illustrated in FIGS. 1, 4A and 4B are merely exemplary. Moreover, some of the steps in FIGS. 5-7 may be reordered within the scope of the invention. Accordingly, these and other embodiments are within the scope of the following claims.

The invention claimed is:

1. A method of scaling a performance of a data processing system having a plurality of processors, the data processing system being capable of running in one or more configurations each including at least one of the processors, the method comprising:
    obtaining a predetermined level of performance for use with the data processing system, the predetermined level of performance specifying a maximum number of instructions to be executed per unit time by the data processing system as a whole without restriction with respect to which of the processors may be used to achieve the predetermined level of performance for the data processing system;
    configuring the data processing system to run in a selected one of the configurations;
    determining a peak performance level provided collectively by the processors included within the selected configuration;
    deriving a scaling factor that is equal to the predetermined level of performance divided by the peak performance level; and
    scaling a performance of each of the processors included within the selected configuration by the scaling factor so that the data processing system as a whole delivers up to the predetermined level of performance.

2. The method of claim 1, wherein the obtaining step includes obtaining an authorization key.

3. The method of claim 1, wherein the configuring step includes enabling each processor included within the configuration.

4. The method of claim 1, wherein the determining step is performed using performance data describing the selected configuration.

5. The method of claim 1, wherein the scaling step includes forcing each included processor into an idle state for a period of time determined by the scaling factor.

6. The method of claim 1, and further including:
    if the scaling factor is below a predetermined minimum value, disabling at least one included processor from the selected configuration, thereby obtaining a different configuration; and
    repeating the determining, deriving, and scaling steps for the different configuration.

7. The method of claim 1, and further including:
    reconfiguring the data processing system into a different one of the configurations; and
    re-scaling the performance of each processor included within the different configuration so that the data processing system is capable of delivering the predetermined level of performance.

8. The method of claim 7, wherein the reconfiguring step is performed automatically.

9. The method of claim 1, and further including:
    obtaining a different predetermined level of performance; and
    re-scaling the performance of each processor included within the selected configuration so that the data processing system is capable of delivering the different predetermined level of performance.

10. A method of scaling the performance of a data processing system having a plurality of processors, the data processing system being capable of running in one or more configurations each including at least one of the processors, the method comprising:
    obtaining a predetermined level of performance for use with the data processing system, the predetermined level of performance specifying a maximum number of instructions to be executed per unit time by the data processing system as a whole without restriction with respect to which of the processors may be used to achieve the predetermined level of performance for the data processing system;
    configuring the data processing system to run in a selected one of the configurations, wherein the selected configuration includes in multiple processor partitions that each includes at least one enabled processor,
    allocating a portion of the predetermined level of performance to a selected one of the processing partitions;
    determining a peak performance level for the selected processing partition;
    deriving a scaling factor for the selected processing partition that is equal to the allocated portion divided by the peak performance level for the selected processing partition; and
    scaling the performance of each enabled processor included within the selected processing partition by the scaling factor to obtain the portion of the predetermined level of performance.

11. The method of claim 10, and including allowing any unallocated portion of the predetermined level of performance to be allocated to a different one of the processing partitions, and repeating the determining, deriving, and scaling steps for the different one of the processing partitions.

12. The method of claim 11, and including repeating the steps of claim 10 for one or more additional ones of the multiple processing partitions.

13. A method of controlling a performance of a data processing system having a plurality of processors, comprising:
providing a predetermined level of performance for use on the data processing system the predetermined level of performance specifying a maximum number of instructions to be executed per unit time by the data processing system as a whole without restriction with respect to which of the processors may be used to achieve the predetermined level of performance for the data processing system;
allowing the data processing system to be configured in any selected one of multiple available configurations;
determining a maximum performance level for the selected configuration;
calculating a scaling factor that is equal to the predetermined level of performance divided by the maximum performance level; and
scaling a performance of the selected configuration by the scaling factor so that the data processing system as a whole provides up to the predetermined level of performance.

14. The method of claim 13, wherein the providing step includes providing an authorization key specifying the predetermined level of performance.

15. The method of claim 14, wherein the authorization key specifies the maximum number of instructions per unit time that may be executed on the data processing system.

16. The method of claim 15, wherein the authorization key specifies a predetermined period of time during which the authorization key may be used.

17. The method of claim 13, wherein each of the multiple available configurations includes at least one of the processors of the data processing system, and further including scaling the performance of each of the processors included within the selected configuration to achieve the predetermined level of performance.

18. The method of claim 17, wherein the performance of each of the processors included within the selected configuration is scaled by the scaling factor.

19. A method of controlling the performance of a data processing system having a plurality of processors, comprising:
providing a predetermined level of performance for use on the data processing system, the predetermined level of performance specifying a maximum number of instructions to be executed per unit time by the data processing system as a whole without restriction with respect to which of the processors may be used to achieve the predetermined level of performance for the data processing system;
allowing the data processing system to be configured in any selected one of multiple available configurations, wherein the selected configuration includes multiple processing partitions, wherein each of the multiple processing partitions includes one or more respective ones of the processors;
allocating at least a portion of the predetermined level of performance to one of the processing partitions;
determining a maximum performance level of the one of the processing partitions;
calculating a scaling factor that is equal to the allocated portion of the predetermined level of performance divided by the maximum performance level; and
scaling the performance of each processor included within the one of the processing partitions by the scaling factor.

20. The method of claim 19, and further including:
if any of the predetermined level of performance remains unallocated, allocating some of all of the remaining portion of the predetermined level of performance to a different processing partition; and
repeating the steps of claim 19 for the different processing partition.

21. The method of claim 20, and further including repeating the steps of claim 20 for all remaining processing partitions.

22. A data processing system, comprising:
a plurality of processors;
a memory coupled to the processors;
Software Controlled Performance Facility (SCPF) software stored within the memory to scale performance of any selected one or more of the processors so that the selected one or more processors collectively deliver up to a predetermined performance level that specifies a maximum number of instructions to be executed per unit time by the data processing system as a whole without restriction with respect to which of the processors may be used to achieve the predetermined performance level for the data processing system; and
performance data stored within the memory,
wherein the SCPF software includes:
means for using the performance data to determine a maximum performance level provided collectively by the selected one or more processors; and
means for deriving a scaling factor that is equal to the predetermined performance level divided by the maximum performance level, the scaling factor being used to scale the performance of the selected one or more processors.

23. The data processing system of claim 22, and further including an authorization key data stored within the memory to specify the predetermined performance level for the data processing system.

24. The data processing system of claim 22, and further including:
at least one cache memory coupled to at least one of the selected one or more processors; and
wherein the maximum performance level takes into account performance effects of the at least one cache memory.

25. The data processing system of claim 22, and further including a system console interactively coupled to select the one or more processors to collectively deliver up to the predetermined performance level.

26. The data processing system of claim 25, wherein the system console allows for re-selection of one or more different processors to be used to collectively deliver the predetermined performance level, and wherein the SCPF software includes means for scaling the performance of the one or more different processors to collectively deliver up to the predetermined performance level.

27. The data processing system of claim 26, and further including means for re-selecting the one or more different processors automatically, and for thereafter scaling the performance of the one or more different processors to collectively deliver up to the predetermined performance level.

28. The data processing system of claim 22, and further including means for re-selecting the predetermined performance level, and wherein the SCPF software includes means for re-scaling the performance of the selected one or more processors to collectively deliver up to the re-selected predetermined performance level.

29. The data processing system of claim 28, wherein reselection of the predetermined performance level and rescaling of the performance is performed automatically.

30. A data processing system, comprising:
- a plurality of processors;
- a memory coupled to the processors;
- Software Controlled Performance Facility (SCPF) software stored within the memory to scale performance of any selected one or more of the processors so that the selected one or more processors collectively deliver up to a predetermined performance level that specifies a maximum number of instructions to be executed per unit time by the data processing system as a whole, without restriction with respect to which of the processors may be used to achieve the predetermined performance level for the data processing system; and
- logic capable of supporting multiple processing partitions, each including one or more of the processors,
- wherein the SCPF software includes:
  - means for allowing allocation of a respective portion of the predetermined performance level to each of the multiple processing partitions;
  - means for using the performance data to obtain a respective maximum performance level for each of the multiple processing partitions; and
  - means for determining a respective scaling factor for each of the multiple processing partitions that is equal to the respective portion of the predetermined performance level divided by the respective maximum performance level for the partition, and
- wherein the SCPF software includes means for scaling the multiple processing partitions to collectively deliver up to the predetermined performance level.

31. The data processing system of claim 30, wherein the SCPF software includes means for scaling the performance of each processor within each partition by the respective scaling factor for the partition.

32. The data processing system of claim 31, wherein the SCPF software includes means for forcing each processor within each partition into an idle state for a period of time dictated by the respective scaling factor.

33. A system for controlling a performance of a data processing system having a plurality of processors, comprising:
- system console means for configuring selected ones of the processors for use within the data processing system; and
- Software Controlled Performance Facility (SCPF) means for limiting the performance of the data processing system to no more than a predetermined performance level by scaling performance of the selected ones of the processors, the predetermined performance level specifying a maximum number of instructions to be executed per unit time by the data processing system as a whole without restriction with respect to which of the processors may be used to achieve the predetermined performance level for the data processing system,
- wherein the SCPF means comprises:
  - means for determining a maximum performance level delivered collectively by the selected ones of the processors; and
  - means for deriving a scaling factor that is equal to the predetermined performance level divided by the maximum performance level, the scaling factor being used to scale the performance of the selected ones of the processors.

34. The system of claim 33, wherein, the system console means includes means for allowing multiple processing partitions to be created on the data processing system, and wherein the SCPF means includes mean for allowing the predetermined performance level to be allocated between the multiple processing partitions.

35. The system of claim 34, wherein each of the processing partitions includes at least one of the processors, and wherein the SCPF means includes means for scaling execution of each processor contained within each partition so that the multiple processing partitions collectively deliver no more than the predetermined performance level.

* * * * *